Oct. 10, 1967     W. GIGER, JR., ET AL     3,346,687
ELECTRIC POWER BUSWAY HAVING NON-SELF-ADHERING INSULATION
BETWEEN THE BUSBARS AND BETWEEN
THE HOUSING AND THE BUSBARS

Filed Aug. 5, 1966

INVENTORS
WALTER GIGER, JR.,
LYNN M. HARTON

BY Robert P. Casey

ATTORNEY

Oct. 10, 1967  W. GIGER, JR., ET AL  3,346,687
ELECTRIC POWER BUSWAY HAVING NON-SELF-ADHERING INSULATION
BETWEEN THE BUSBARS AND BETWEEN
THE HOUSING AND THE BUSBARS

Filed Aug. 5, 1966  2 Sheets-Sheet 2

INVENTORS
WALTER GIGER, JR.,
LYNN M. HARTON
BY Robert P. Casey
ATTORNEY

United States Patent Office 3,346,687
Patented Oct. 10, 1967

3,346,687
ELECTRIC POWER BUSWAY HAVING NON-SELF-ADHERING INSULATION BETWEEN THE BUSBARS AND BETWEEN THE HOUSING AND THE BUSBARS
Walter Giger, Jr., West Hartford, and Lynn M. Harton, Avon, Conn., assignors to General Electric Company, a corporation of New York
Filed Aug. 5, 1966, Ser. No. 570,598
10 Claims. (Cl. 174—68)

Our invention relates to electric power distribution systems of the type including a plurality of electric power busbars supported in insulated relation in an elongated duct or housing, and commonly referred to as "busways."

In accordance with prior art practice, it has been found desirable to utilize a construction in which the busbar conductors are maintained in intimate thermal contact with each other and with the busway housing by substantial pressure all along the length of the busway. Busways having this construction are utilized because of the very efficient heat dissipation which occurs therein, and because of the low voltage drop present per given unit length of busway. An example of such a busway is shown in the co-pending application of L. E. Fisher, Ser. No. 542,925 filed Apr. 15, 1966, and assigned to the same assignee as the present application.

Employing busbar conductors which are maintained by pressure in intimate contact with each other and also with the busway housing along the major portion of the length of the busbars has created a problem, however, with respect to insulating the busbar conductors. Thus it has been found that after a period of time, insulated busbar conductors utilized in such constructions bond or stick together, and also to the busway housing. The individual busbar conductors, which are subject to thermal expansion because of the heat generated therein by the electricity passing therethrough, expand in differing amounts due to different degrees of heating, and differences in frictional forces. When the insulated busbar conductors become bonded together and such differential expansion occurs, the busbars slide or move longitudinally with respect to each other, and the insulation becomes ruptured. This occurs between the busbar conductors and to the busway housing, as well as between busbars. In addition, such sticking or bonding of insulated surfaces causes tearing of the insulation when the busway is subjected to short-circuit conditions. This is because the bars flex and separate a small amount under such conditions.

While insulation materials are known to be available which do not adhere in the manner described, these materials are either uneconomical to use as a busbar covering because of material or application costs, or are not suitable because their inherent stiffness renders them non-conforming to shapes such as busbars.

It is an object of the present invention to provide a busway including insulated busbar conductors in intimate thermal contact with each other and with the busway housing under pressure throughout a substanial portion of their length, wherein the insulation is not subject to rupturing, cracking, tearing, etc., because of differential movement of such busbars.

It is another object of the invention to provide a busway of the type described which is not subject to failure of insulation because of relative movment of conductors, and which is economical to manufacture.

In accordance with the invention in one form, an electric power busway is provided including a plurality of elongated electrical conductors or busbars. The busbars are each provided with a covering of a first insulating material. The insulated busbars are retained in side-by-side contact under pressure, by a metallic housing including two side plates which press the busbars together. The first insulating material provides an effective economical, form-conforming coating for the busbars, but it has the characteristic of adhering to itself and to most other materials when pressed thereagainst for long periods of time. Accordingly, between each adjacent pair of such insulated busbars, there is provided, in accordance with the present invention, at least two thin layers or strips of a second material having the characteristic that it does not adhere to itself. After assembly, one of such strips of each pair becomes adhered to the insulating coating of one of the two bars between which the strips are located and the other becomes adhered to the coating of the other of such bars. When differential expansion cause relative longitudinal movement of the bars, each strip of second material moves with the busbar to which it is adhered, and the two strips slide against each other, with no damage to the insulation. In addition to eliminating the problem of insulation sticking, the two strips of second insulating material also serve to provide part of the required thickness of insulation material between bars.

The invention will be more fully understood by reference to the following detailed description taken in connection with the accompanying drawings, and its scope will be pointed out in the appended claims.

Figure 1:
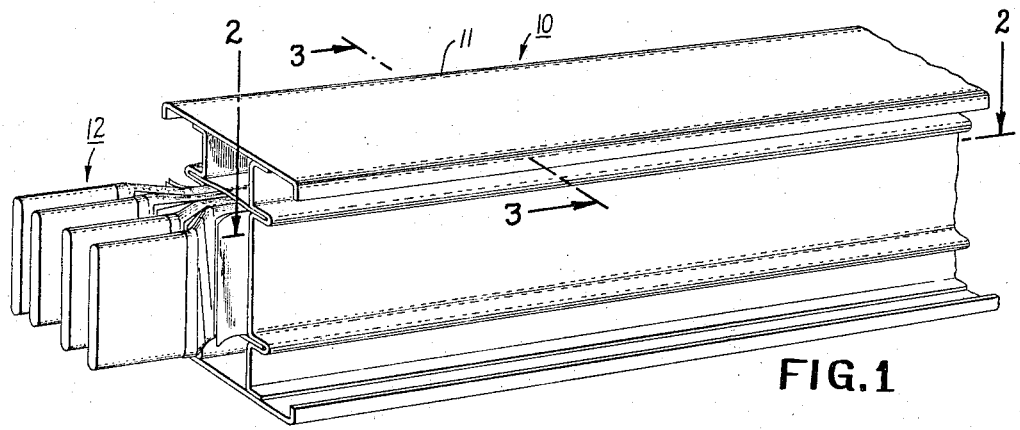
FIGURE 1 is a perspective view of a busway section incorporating the invention.
Figure 2:
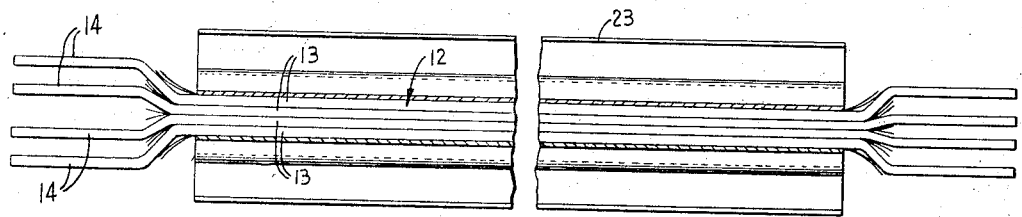
FIGURE 2 is a sectional plan view of the busway section of FIGURE 1, taken substantially on the line 2—2 of FIGURE 1.

Referring now to FIGURE 1, there is shown therein a busway section 10 incorporating the present invention. Certain aspects of the busway housing structure disclosed herein are disclosed and claimed in the co-pending application of C. M. Stevens, Ser. No. 570,504, filed Aug. 5, 1966 and assigned to the same assignee as the present invention.

The busway section of FIGURE 1 comprises a busway housing 11, and an assembly 12 of busbar conductors 13. Each of the busbars 13 comprises an elongated relatively wide, thin, flat conductor 13 having its ends 14 offset to facilitate overlapping connection to corresponding busbars of an adjacent section.

Figure 7:
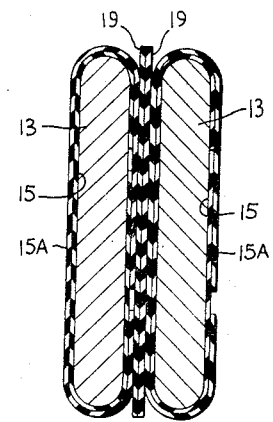
FIGURE 7 is a sectional view on enlarged scale of a pair of adjacent busbars of the busway section of FIGURE 1, the relative thickness of insulation thereon being exaggerated for clarity.

Referring particularly to FIGURE 7, each busbar conductor 13 has thereon a first wrapping 15 of insulation material which substantially surrounds the busbar but has its edges closely adjacent but non-overlapping. A second wrapping 15A of insulation material is placed over the first wrapping 15 in such a manner as to cover the slight crack or gap between the edges of the wrapping 15. The partial overlapping of either wrapping is avoided in order to ensure flat surfaces which will give good thermal contact between bars, with very little entrapped air. A "pressure sensitive" adhesive is preferably utilized on the inner sides of each of the wrappings 15, 15A to ensure that they remain properly positioned.

The material preferably used for the wrappings 15 and 15A is a glass cloth, impregnated with a polyester plastic compound or varnish. Each of the wrappings 15 and 15A has a thickness of about .010 inch. This material has been found to provide the desired degree of flexibility so as to conform closely to the surface of the busbars with no air gaps or pockets, provides the required dielectric strength, abrasion, resistance, etc., and is also economical to use. Other materials which could be used for the wrappings 15 and 15A are polyester-impregnated fiber sheet, oleoresinous varnish-impregnated fiber sheet, polyethylene sheet material, vinyl sheet material, and butyl sheet material.

The offset end portions of the bars 13 are covered with a spiral wrapping comprising a strip of cloth-like insulation material of the same general type as the wrappings 15 and 15A. A spiral wrapping is used here since the sleeve-type or "cigarette wrap" technique used on the straight bar lengths does not lend itself to smooth covering of such bends.

Figures 3, 4:
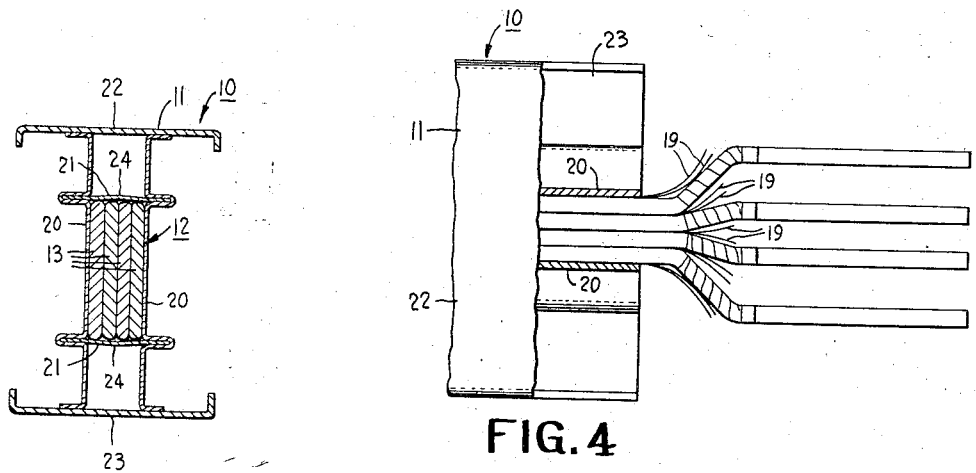
FIGURE 3 is an elevational sectional view of the busway section of FIGURE 1 taken substantially on the line 3—3 of FIGURE 1.
FIGURE 4 is a view on an enlarged scale of an end portion of the busway of FIGURE 1, a portion of the top cover being broken away.
Figure 6:
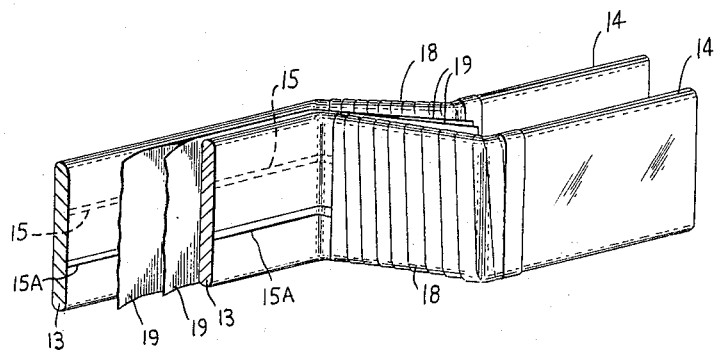
FIGURE 6 is a perspective view of an end portion of two of the busbars of the busway section of FIGURE 1.

In accordance with the invention, two strips 19 of insulation material of a second type are interposed between adjoining busbar conductors and between the busbar conductors and the busway housing, as shown particularly in FIGURE 4 and FIGURE 6. The strips 19 may comprise any material having the required thermal stability and electrical insulating qualities and also having the characteristic that it does not adhere to itself. A material which we have found suitable for this use is a polyethylene terephthalate material such for example as the material designated Mylar Type A manufactured and sold by the DuPont Company and having a thickness of .005 inch. This material will not adhere to itself even when subjected to a temperature of 155° C. for an extended period of time. Thus, even though the wrappings 15, 15A and the spiral wrapping 18 applied to the busbar conductors adhere to the polyethylene terephthalate after a period of time, each of the insulated busbars is free to move relative to each other and relative to the house, since the thin layers of polyethylene terephthalate, in effect provide a non-adhering surface for each bar. Other materials which could be used for the strips 19 are nylon, polytetrafluoroethylene, and polycarbonate.

This use of two layers 19 of non-self-adhering insulating material in the manner described also prevents the insulation material applied to the busbar conductors from tearing when high short-circuit currents set up forces causing mutual repulsion of bars and therefore temporary separation of adjacent bars.

The problem of insulation cracking and/or tearing is intensified by reason of the nature of the construction of busways of the type shown in FIGURE 1. Thus, with reference to FIGURES 3 and 5, the busway housing 11 is shown as comprising a pair of side plates 20, interconnected by spaced tie plates 21. The side plates 20 are further interconnected in spaced relation to the tie plates 21 by a top and a bottom plate 22 and 23, respectively. The assembly of busbar conductors is thus held captive in a chamber defined by the side plates 20 and the tie plates 21. The side plates 20 exert pressure on the outermost busbar conductors 13 of the assembly 12. This pressure is exerted along the entire length of the busway section as shown in FIGURE 1. The pressure which the side plates exert ensures intimate contact between adjoining busbar conductors and between the busbar conductors and the busway housing as set forth in detail in the above-mentioned patent application. On the other hand, under this pressure the insulation material applied to the busbar conductors is much more likely to bond or stick than in constructions not including such length-wise pressure.

Figure 5:
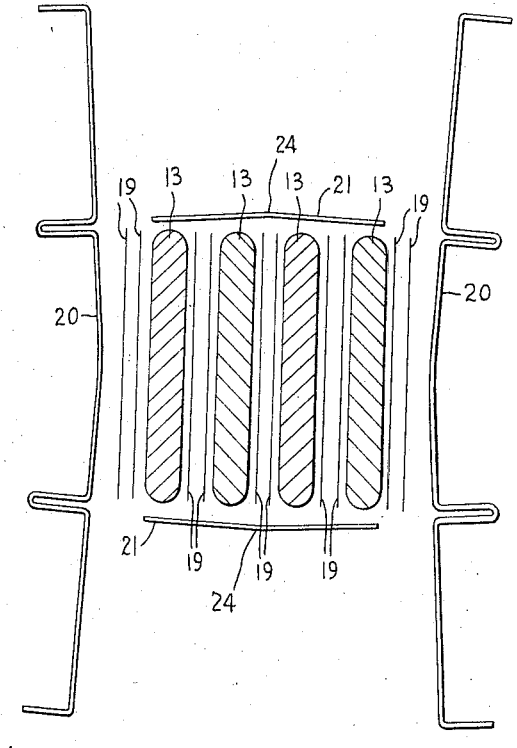
FIGURE 5 is an exploded sectional view similar to FIGURE 4, showing the parts in the condition they have prior to assembly.

The tie-plates 21 each include an intermediate offset portion 24 extending lengthwise along the center thereof, see FIGURES 3 and 5. This offset permits the side walls 20 to separate slightly under short-circuit conditions, thereby allowing slight separation of the busbars 13, increasing the reactance of the system and limiting the short-circuit current. This novel construction is more fully described and is claimed in copending application Ser. No. 570,599, filed Aug. 5, 1966.

While the present invention has been illustrated with respect to a specific embodiment of busway, it will be readily apparent that different embodiments of busway can be used without departing from the spirit and scope of the invention. Similarly, although the main portion of the busbar conductors have been shown as insulated with a pair of sleeve-like or "cigarette-wrap" coverings, it will be apparent that other insulation covering techniques may be utilized, such as spiral wrapping, dip-coating, etc. We therefore, intend by the appended claims to cover all such modifications as fall within the true spirit and scope of the invention.

What we claim as new and desire to secure by Letters Patent of the United States is:

1. Electric power busway apparatus comprising:
 (a) an elongated rigid housing;
 (b) a plurality of relative wide thin flat busbars supported in said housing in side-by-side relation with said flat surfaces adjacent each other;
 (c) means carried by said housing urging said busbar conductors together throughout the major portion of the length of said housing;
 (d) a first layer of a first insulating material on each of said bars;
 (e) at least two separate sheets of a second insulating material between each pair of adjacent busbars;
 (f) said first material having the characteristic of adhering to itself under sustained pressure;
 (g) said second material having the characteristic of not adhering to itself under sustained pressure, each of said two sheets of insulating material adhering to said first insulating material of said adjacent busbars respectively, whereby relative movement between said pairs of busbars causes relative sliding movement of said two sheets of said second insulating material.

2. Electrical power busway apparatus as set forth in claim 1 wherein said first material comprises a material selected from the class consisting of polyester-impregnated fiber sheet, oleoresinous varnish-impregnated fiber sheet, polyethylene sheet material, vinyl sheet material, and butyl sheet material, and said second material comprises a material selected from the class consisting of polyethylene terephthalate, nylon, polytetrafluoroethylene, and polycarbonate.

3. Electric power busway apparatus as set forth in claim 1 wherein said first material comprises a material selected from the class consisting of polyester varnish-impregnated fiber, oleoresinous varnish-impregnated glass fiber, polyethylene sheet material, vinyl sheet material, and butyl sheet material, and wherein said second material comprises polyethylene terephthalate.

4. An electric power busway apparatus comprising:
 (a) an elongated rigid housing, said housing including a pair of generally planar opposed side walls;
 (b) a plurality of relatively wide thin flat busbar conductors supported in said housing in juxtaposed relation in a row with said wide faces adjacent each other in a row extending between said opposed side members;
 (c) said housing also comprising means urging said side walls toward each other and against the said wide faces of the outer ones of said busbar conductors and clamping said busbar conductors together substantially uniformly throughout a major portion of the length of said housing;
 (d) a first insulating material on said busbar conductors;
 (e) at least two sheets of a second insulating material between each adjacent pair of said busbar conductors and between said outer conductors and the adjacent one of said side wall members of said housing respectively;

(f) said first material having the characteristics of adhering to itself when subjected to pressure for a substantial period of time;

(g) said second material having the characteristic not adhering to itself when subjected to substantial pressure for a substantial period of time.

5. Electric power busway apparatus as set forth in claim 4 wherein said first material comprises a material selected from the class consisting of polyester impregnated glass fiber, oleoresinous varnish impregnated glass fiber, polyester varnish impregnated fiber sheet, oleoresinous varnish impregnated fiber sheet, polyethylene sheet material, vinyl sheet material, and butyl sheet material, and said second material comprises a material selected from the class consisting of polyethylene terephthalate, nylon, polytetrafluoroethylene, and polycarbonate.

6. Electric power busway apparatus as set forth in claim 4 wherein said first material comprises a material selected from the class consisting of polyester impregnated fiber sheet, oleoresinous varnish impregnated fiber sheet, polyethylene sheet material, and vinyl sheet material, and said second material comprises polyethylene terephthalate.

7. An electrical power distribution system section comprising:
(a) an elongated rigid metallic housing having at least one pair of opposed substantially flat side walls;
(b) a plurality of wide, thin, flat, elongated electrical conductors positioned within said housing;
(c) each of said electrical conductors having a wide face thereof in juxtaposed relation to a wide face of another of said plurality of electrical conductors;
(d) the outermost ones of said plurality of electrical conductors having a wide face thereof in juxtaposed relation to said pair of opposed substantially flat side walls;
(e) each of said electrical conductors having at least one layer of a first insulation material thereon;
(f) a plurality of layers of a second insulation material interposed between said wide faces of adjoining ones of said plurality of electrical conductors;
(g) a plurality of layers of said second insulation material interposed between said wide faces of said outermost ones of said plurality of electrical conductors and said side walls;
(h) said opposed side walls compressing said electrical conductors toward each other, and thereby said plurality of layers of said second insulation material interposed therebetween all along the length thereof, and (i) said second insulation material adhering only to said first insulation material whereby said electrical conductors are not restricted from movement by said material.

8. Electric power busway apparatus comprising:
(a) an elongated rigid housing having a pair of opposed side walls, a pair of top and bottom walls interconnecting said side walls, and a pair of transversely extending tie plates extending substantially co-extensive with said housing, said tie plates extending between said side walls at points thereof intermediate said top and bottom plates and dividing said housing into a first central chamber and a second and third upper and lower chambers;
(b) a plurality of relatively wide thin flat busbar conductors supported in said housing and extending in side-by-side relation between said side walls in a row;
(c) insulating means of first material on said busbar conductors;
(d) said opposed side walls having an inherent bias urging said busbar conductors toward each other into high pressure engagement throughout a substantial portion of the length of said housing;
(e) a pair of separate insulating sheets between each pair of adjacent busbar conductors and between the end ones of said row of busbar conductors and the adjacent housing side wall adjacent thereto, said insulating sheets comprising a material having the characteristic of not adhering to itself under sustained substantial pressure.

9. Electric power busway apparatus as set forth in claim 8 wherein said housing also includes means permitting separation of said busbar conductors when said busway apparatus is subjected to relatively high short-circuit current conditions.

10. Electric power busway apparatus as set forth in claim 9 wherein said insulation on said busbar conductors comprises at least one elongated strip of insulating material extending along the length of said busbar conductor and being wrapped once around said conductor and covering slightly less than 100 percent of the outer side surface of said busbar conductor.

References Cited
UNITED STATES PATENTS

| | | | |
|---|---|---|---|
| 3,187,086 | 6/1965 | Moodie et al. | 174—68 |
| 3,202,756 | 8/1965 | Stanback | 174—99 |
| 3,264,403 | 8/1966 | Erdle | 174—72 |

LARAMIE E. ASKIN, *Primary Examiner.*